US008616487B2

(12) United States Patent
Mugelli et al.

(10) Patent No.: US 8,616,487 B2
(45) Date of Patent: Dec. 31, 2013

(54) APPARATUS AND METHOD FOR WINDING AND TERMINATING CORES OF DYNAMOELECTRIC MACHINES (75) Inventors: Maurizio Mugelli, San Gimignano (IT); Massimo Ponzio, Florence (IT)

(73) Assignee: ATOP S.p.A., Barberino Val d'Elsa, Florence (IT)

( * ) Notice: Subject to any disclaimer, the term of this patent is extended or adjusted under 35 U.S.C. 154(b) by 799 days.

(21) Appl. No.: 12/864,591

(22) PCT Filed: Feb. 20, 2009

(86) PCT No.: PCT/EP2009/001253
§ 371 (c)(1),
(2), (4) Date: Jul. 26, 2010

(87) PCT Pub. No.: WO2009/106273
PCT Pub. Date: Sep. 3, 2009

(65) Prior Publication Data
US 2010/0301154 A1 Dec. 2, 2010

(30) Foreign Application Priority Data

Feb. 27, 2008 (IT) ................. TO2008A0137

(51) Int. Cl.
*H02K 15/085* (2006.01)
(52) U.S. Cl.
USPC .............. 242/432.4; 242/439.1; 29/596
(58) Field of Classification Search
USPC ............. 242/432–432.4, 439.1; 29/596
See application file for complete search history.

(56) References Cited

U.S. PATENT DOCUMENTS

| 3,879,841 | A | * | 4/1975 | Mason | 29/596 |
|---|---|---|---|---|---|
| 3,995,785 | A | * | 12/1976 | Arick et al. | 242/432.4 |
| 5,273,223 | A | * | 12/1993 | Tsugawa | 242/432.4 |
| 6,003,805 | A | * | 12/1999 | Newman | 242/432.5 |
| 6,702,222 | B2 | * | 3/2004 | Meier | 242/432.6 |
| 6,732,970 | B2 | * | 5/2004 | Dolgas et al. | 242/432.4 |
| 2004/0163232 | A1 | * | 8/2004 | Becherucci et al. | 29/596 |

FOREIGN PATENT DOCUMENTS

| EP | 0 982 837 | 3/2000 |
|---|---|---|
| EP | 1 420 505 | 5/2004 |
| JP | 2003-169455 | 6/2003 |
| WO | WO 2005/124974 | 12/2005 |

* cited by examiner

*Primary Examiner* — Emmanuel M Marcelo
(74) *Attorney, Agent, or Firm* — Ropes & Gray LLP (57) ABSTRACT Apparatus and method for winding coils C of at least one electrical conductor W for at least one core (11) of a dynamoelectric machine and for forming termination leads of the coils, the core having a longitudinal axis (H'), the apparatus and method using a dispensing member (20) and rotation of the dispensing member (20) around a rotation axis (25') to re-orient the dispensing member between an orientation for winding the coils and an orientation for forming the termination leads. An axis of reference (21') for the relative translation of the dispensing member (20) is positioned parallel and shifted with respect to the longitudinal axis (H') of the core or coincident with the longitudinal axis (H') of the core. The rotation axis (25') is inclined with an angle that is not at 90° with respect to the dispensing member. In particular the rotation axis (25') is inclined by an angle of 45 degrees with respect to the dispensing member (20) and the rotation axis (25') intersects the exit of the conductor during the rotation.

42 Claims, 8 Drawing Sheets

APPARATUS AND METHOD FOR WINDING AND TERMINATING CORES OF DYNAMOELECTRIC MACHINES

THE FIELD OF THE INVENTION

The present invention relates to solutions for winding cores of dynamoelectric machines by using a needle which dispenses at least one electrical conductor to form coils of a predetermined number of turns. Before and after winding, the needle is used to place termination leads of the coils along predetermined trajectories located around the ends of the core.

DESCRIPTION OF THE RELATED ART

The needle has a passage for guiding the conductor towards the core during winding of the coils and forming of the termination leads. Feeding of the conductor through the needle passage towards the core occurs by using relative motions between the needle and the core. These motions comprise relative translations and relative rotation motions.

For precisely locating the conductor during forming and placement of the termination leads, the needle needs to be relatively moved with respect to the core to deposit the conductor on a predetermined trajectory. At the same time the needle needs to avoid collision with the structure of the core. This requires changing the orientation of the needle with respect to the orientation of the needle used during winding, so that the wire can be deposited correctly and the needle can remain clear of obstacles present on the core.

During winding to form the coils, the needle passage where the wire runs is normally positioned perpendicular to the longitudinal axis of the core. The longitudinal axis of the core can be considered as a reference axis, which is normally central and parallel to the extension of the core slots. The slots are the portions of the core where the coils are placed during the winding operations. The needle needs to be re-oriented by a rotation mechanism, which is actuated when passing between the stages of winding the coils and the stages of forming and placing the termination leads. Mechanisms for rotating the needle between these two orientations have been described in U.S. Pat. No. 6,098,912, JP 2003 169455 and EP 1,759,446, or were previously known.

Certain trajectory configurations where the termination leads can be positioned have been described in EP 1420505.

Mechanisms for rotating the needle need to pass through the interior of the core, or in the spacing existing between external structures of the core. Modern cores need to be compact and therefore allow little room for movement of the needle and the associated rotating mechanisms.

SUMMARY OF THE INVENTION

An object of the present invention is to provide a winding and termination solution having a conductor dispensing nozzle (in the following also referred to as needle) that can be oriented by a mechanism that occupies less space within, or around the core. In this manner smaller and more complex core structures can be wound and terminated The complicated and multiple routings for placing the termination leads around the core require complex structures assembled on the core for support and termination. With respect to these structures the needle needs to move appropriately to deposit the wire and to avoid collision during termination.

A further object of the present invention is to provide a winding and termination solution having a conductor dispensing nozzle, which is capable of more variable and programmable movements in order to place the leads along more complicated trajectories.

Cores for low voltage applications, like those for automotive applications, are wound with conductors having large section. These conductors require considerable pulling tension on the dispensing nozzle and the related moving mechanism. Consequently, reliable mechanical resistance and low wear of the winding apparatus needs to be guaranteed.

A further object of the present invention is to provide a winding and termination solution having a conductor dispensing nozzle that can wind and position termination leads formed of conductors having large sections.

A further object of the present invention is to provide a winding solution having a conductor dispensing nozzle that can be easily adapted to wind and position termination leads on cores of different configurations. These and other objects of the invention are achieved with the apparatus according to the claims 1 and 27 and the method according to claims 18 and 35.

Further characteristics of the invention are indicated in the subsequent dependent claims.

The above and other objects, features and advantages of the present invention will become apparent from the following description with reference to the accompanying drawings which illustrate examples of the present invention.

BRIEF DESCRIPTION OF THE DRAWINGS

In FIG. 4 the core is not shown for reasons of clarity.

DETAILED DESCRIPTION OF THE PREFERRED EMBODIMENTS

Figure 1A:
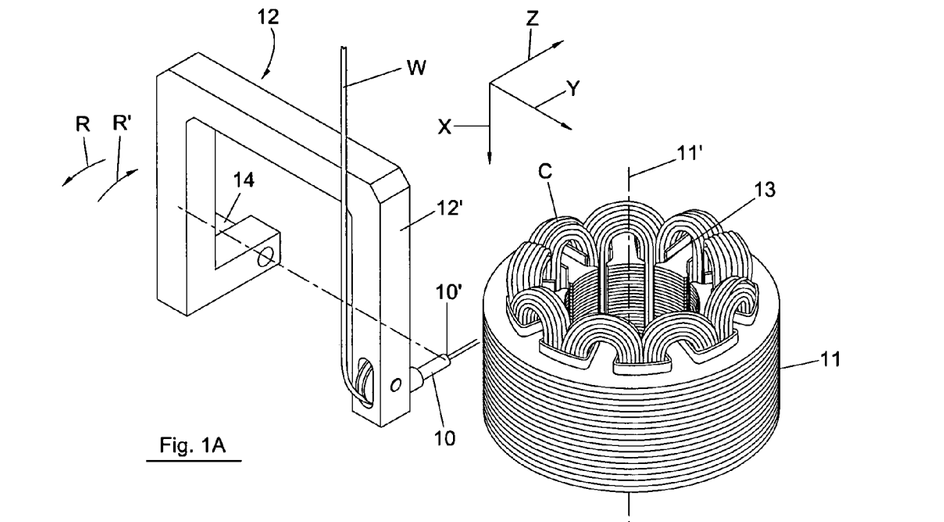
FIG. 1A is a perspective view illustrating a previously known apparatus or like that of JP 2003 169455 according to a condition for winding a core of a dynamoelectric machine.
Figure 1B:
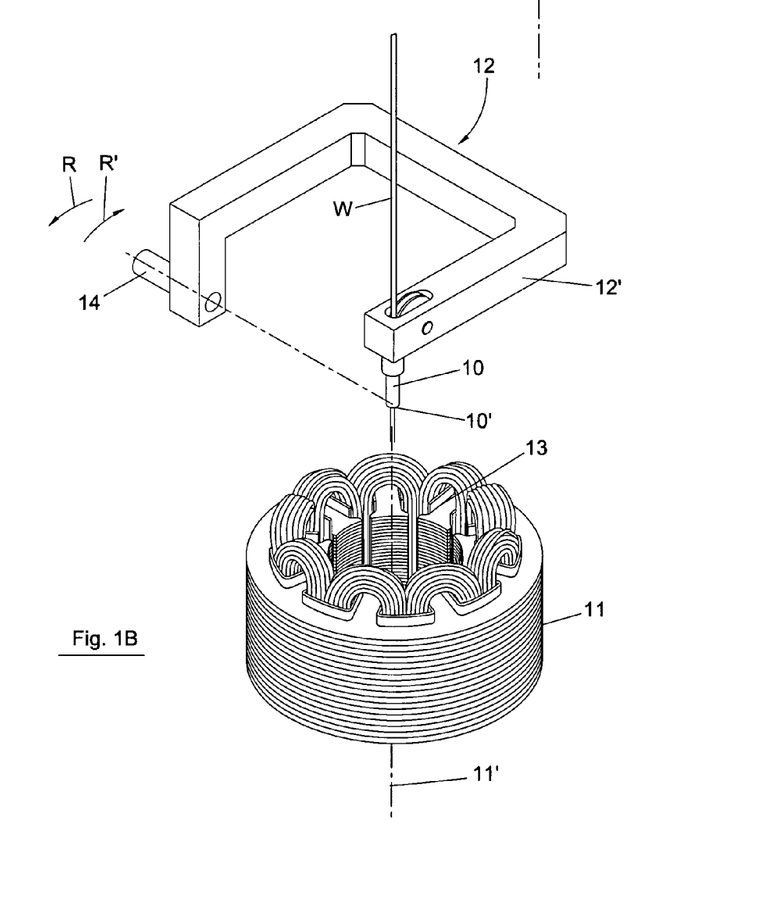
FIG. 1B is a perspective view illustrating the apparatus of FIG. 1A according to another condition for forming and placing termination leads of the coils.

With reference to FIGS. 1A and 1B, a previously known mechanism or like that of JP 2003 169455 is shown for supporting and rotating winding needle 10 during the winding and termination stages.

FIG. 1A illustrates the stage in which the needle 10 is oriented for winding the coils C using wire W.

FIG. 1B illustrates the stage in which the needle 10 is re-oriented by 90° for forming and placing leads of wire W during termination.

Wire W comes from a tensioner (not shown), passes through the final passage of needle 10 to reach core 11. Needle 10 is supported by arm 12, which is provided with translation motions in directions X, Y and Z for winding and terminating wire W on core 11.

To wind core 11, thus to form the coils C of wire W in slots 13, the tubular passage of needle 10 is oriented perpendicular to the longitudinal axis 11' of the core (as shown in FIG. 1A). In addition the needle is translated with reciprocation motion in direction X through the core, i.e. parallel to longitudinal axis 11', to deliver wire W in slots 13. The longitudinal axis 11' of the core is parallel to the extensions of the slots 13.

The translation of the needle occurs by moving arm portion 12' with reciprocating translation parallel to axis 11' and by passing it through the inside of core 11. During the winding stage, core 11 can be rotated around longitudinal axis 11' to form the heads of the coils, i.e. the cross over portions of the coils for passing from one slot to another.

For terminating the core, the tubular passage of needle 10 is oriented parallel to the longitudinal axis 11', as shown in FIG. 1B. The change of orientation of the needle occurs by rotating arm 12 around pin 14 for an angle of 90° in direction R'. To return the needle back to the winding orientation of FIG. 1A, arm 12 is reversely rotated around pin 14 for an angle of 90°, therefore arm 12 is rotated in direction R.

In FIGS. 1A and 1B the mechanisms for rotating the needle around pin 14 and for translating the needle in direction X, Y and Z have been omitted for reasons of clarity. Similarly the mechanism for rotating core 11 around axis 11' has been omitted for reasons of clarity. Exit 10' where wire W leaves the needle passage to reach core 11 is aligned with the axis of pin 14, as shown in FIGS. 1A and 1B. Consequently the needle rotates around the instantaneous position of exit 10' during rotations in directions R and R'. In this way wire W does not leave needle 10 during the rotations in direction R and R'.

This avoids the formation of unwanted lengths of wire during rotations in direction R and R'. The extra lengths of wire would need to be recovered by the tensioner, or would have to be coursed by the needle along specific trajectories to avoid loosing wire tension.

The size and configuration of arm 12 determine the size of the core that can be wound with the solution illustrated in FIGS. 1A and 1B, therefore arm 12 needs to be substituted for winding and terminating certain core sizes. Arm 12 is cantilevered and extends considerably from pin 14. This produces a considerable inertia with respect to pin 14. Consequently, rapidity and precision of the movements of the needle for winding and termination are hindered if arm 12 has to be wide and long in portion 12'.

Figure 2:
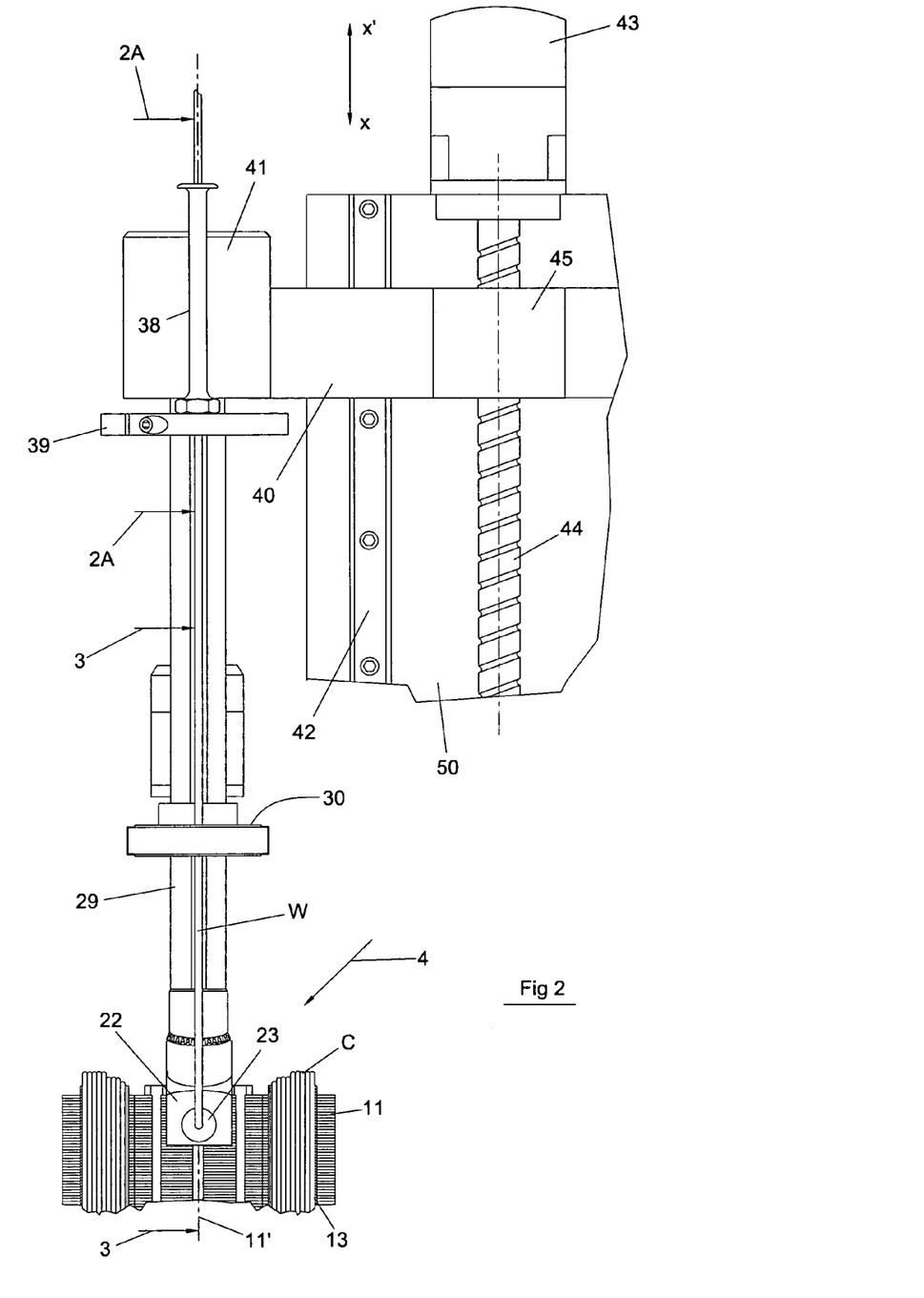
FIG. 2 is a partial section view illustrating the apparatus of the invention as seen from directions 2 of FIG. 3.
Figure 3:
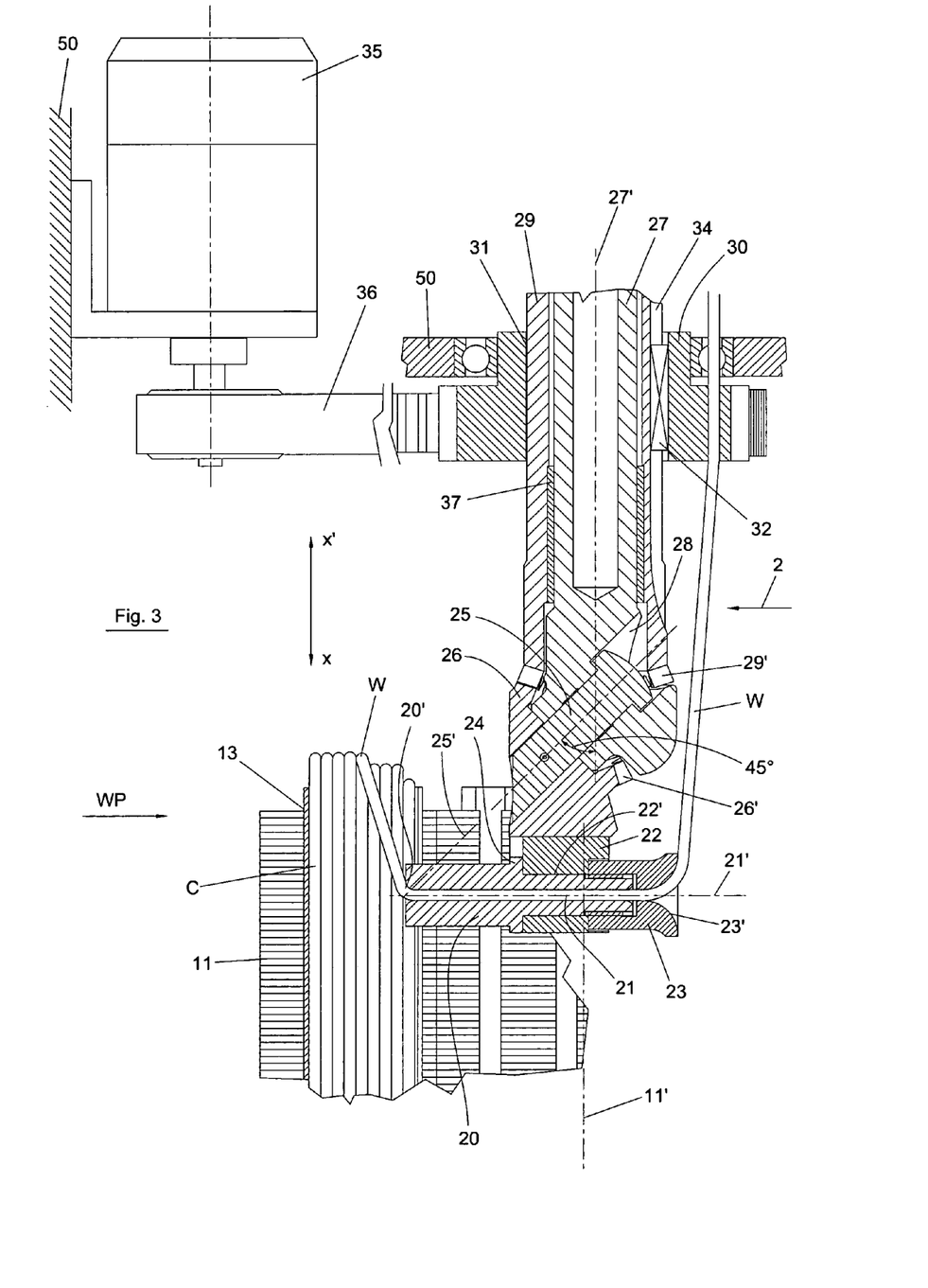
FIG. 3 is a partial section view as seen from view directions 3-3 of FIG. 2 illustrating a winding condition of the apparatus.

With reference to FIGS. 2 and 3 which illustrate an embodiment of the invention, needle 20 is provided with exit 20' where wire W leaves needle passage 21 to reach core 11. In FIGS. 2 and 3, the needle 20 can be translating in directions X and X' with reciprocation motion parallel to the longitudinal axis 11' of core 11 to wind wire W in order to form coil C in slots 13.

Figure 5:
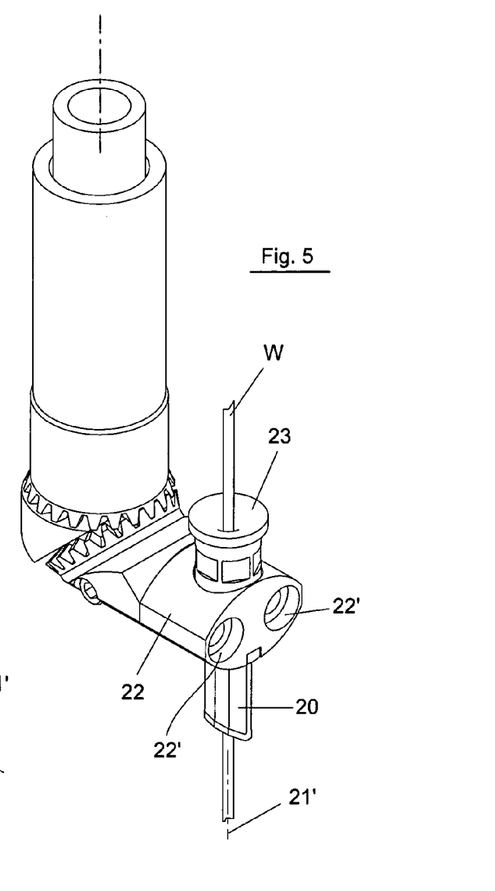
FIG. 5 is a view similar to the view of FIG. 4, although illustrating the apparatus of the invention according to a condition for termination of a core of a dynamoelectric machine, therefore in a condition similar to that of FIG. 3A.

Needle 20 is seated in a bore 22' of support member 22 (see FIG. 3). Guide member 23 is screwed on to the end of needle 20 to pull flange portion 24 of needle 20 against member 22. In this way needle 20 becomes fixed to member 22. Guide member 23 has a flared portion 23' to smoothly guide wire W into passage 21 of needle 20. Support member 22 is secured to a second support member 26 by means of bolts (not shown), which are located in bores 22' (see FIG. 5). Second support member 26 is assembled to rotate together with pin 25 (see FIG. 3). Pin 25 is assembled to rotate in bore 28. Bore 28 is located on an end portion of support shaft 27 and is aligned with axis 25'.

Axis 25' or bore 28 is not inclined at 90° with respect to reference axis 27' of support shaft 27.

Figure 3A:
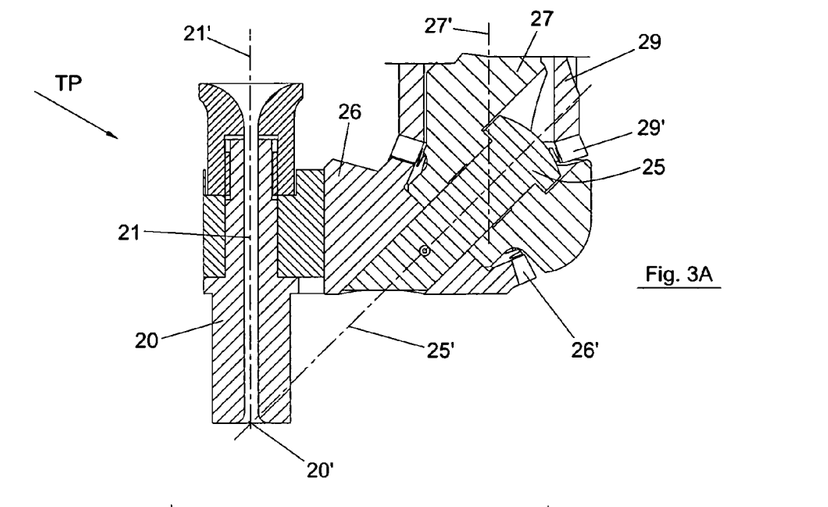
FIG. 3A is a partial section view similar to FIG. 3 illustrating a termination condition of the apparatus, although without the wire conductor present for reasons of clarity.
Figure 4:
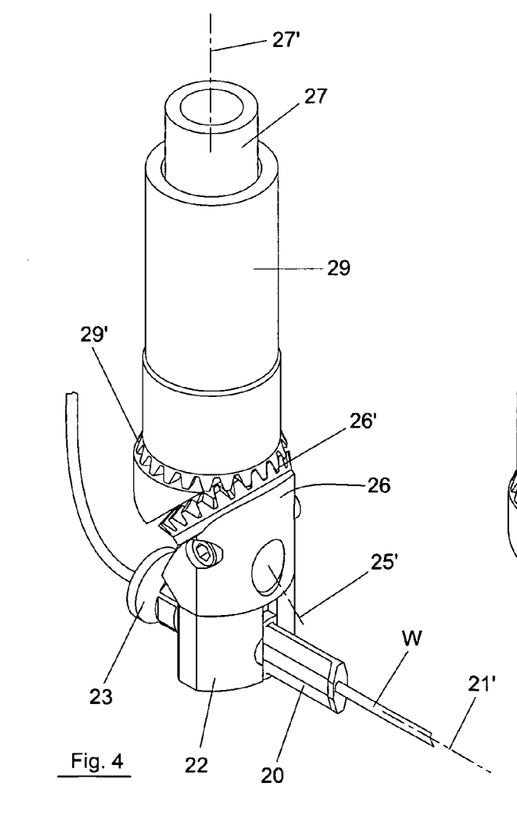
FIG. 4 is a perspective view from direction 4 of FIG. 2 illustrating the apparatus of the invention according to a condition for winding a core of a dynamoelectric machine.

Axis 27' can be parallel and distanced with respect to longitudinal axis 11', like is shown in FIGS. 3 and 3A. Alternatively, axis 27' can be coincident with axis 11' depending on the positioning of needle 20 required for winding and termination.

The incline of axis 25' is more than 0° and less than 90°. In particular, the incline can be 45°, like is shown in FIG. 3. In addition, axis 25' can intersect the exit 20' of needle 20, like is shown in FIG. 3. Second support member 26 is provided with a gear portion 26', like is shown in FIGS. 2-5. Gear portion 26' meshes with gear portion 29' of drive tube 29.

Gear portion 26' rotates around axis 25' by rotating gear portion 29' around axis 27'. Rotation of drive tube 29 around axis 27' causes gear portion 29' to rotate around axis 27'.

A 180° rotation of second support member 26 around axis 25' can occur by rotating drive tube 29 for 180° around axis 27'. This causes needle 20 to rotate around axis 25' for 180°. Rotation of needle 20 around axis 25' produces a succession of positions of the section of needle 20 out of the plane of FIG. 3. The plane of FIG. 3 can be considered as defined by axes 25' and 27' and where the position WP for winding is located as seen in a section view. The full 180° rotation of needle 20, or of axis 21' of passage 21, around axis 25' brings the section of needle 20 back into the plane of FIG. 3 to occupy a second position TP (see FIGS. 3A and 5), which is required for termination. The second position TP is characterized by the needle being oriented with the section of passage 21 (see axis 21') rotated by 90° in the plane of FIG. 3 (see also FIG. 3A).

Furthermore, due to the fact that the needle passage 21 has rotated around the instantaneous position of exit 21' no extra wire has been pulled through needle 20.

Figure 2A:
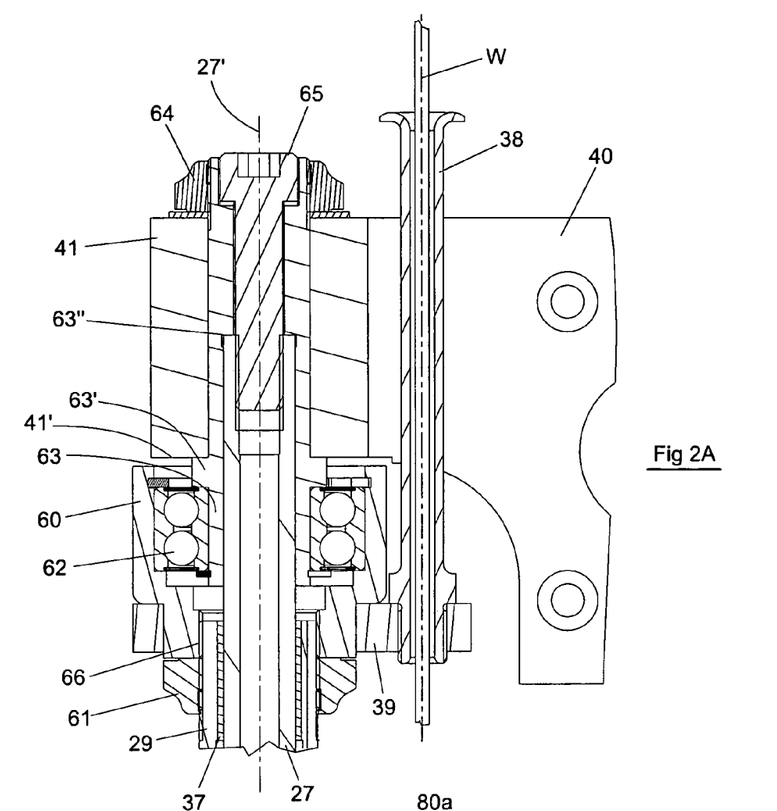
FIG. 2A is a partial section view as seen from view directions 2A-2A of FIG. 2.

Drive tube 29 is coupled to a connection structure 41 of slide 40 (see FIGS. 2, 2A and 3).

Support shaft 27 is assembled within the interior of drive tube 29. Bushes like 37 of FIGS. 2A and 3 are interposed between support shaft 27 and drive tube 29 to support rotation of drive tube 29 around support shaft 27, and therefore the rotation of drive tube 29 around axis 27'.

Threaded end 66 of drive tube 29 is screwed onto support 60. Lock nut 61 is screwed around the end 66 of drive tube 29 to secure that drive tube 29 remains screwed to support 60. The outer ring of bearing 62 is assembled to be fixed on support 60. The inner ring of bearing 62 is assembled to be fixed on cylindrical member 63. The end of support shaft 27 is assembled on cylindrical member 63. Cylindrical member 63 is secured to connection structure 41 by means of bolt 64, which screws on to the end of cylindrical member 63 to pull flange portion 63' of member 63 against abutment surface 41' of connection structure 41, as shown in FIG. 2A.

The end of support shaft 27 which is assembled through member 63 becomes pulled by bolt 65 to abut against member 63 in abutment surface 63". In this way support shaft 27 is secured along axis 27' and is impeded from rotating around axis 27'.

Slide 40 is capable of translating with reciprocation motion in directions X and X' (see FIG. 2), and therefore translates parallel to axis 11' of the core, on guides 42 of the apparatus frame 50. To achieve this motion, motor 43 rotates screw 44. Screw 44 engages threaded sleeve 45 of slide 40. Consequently, forward and opposite rotations of motor 43 cause slide 40 to translate with reciprocation motion in directions X and X'.

With reference to FIGS. 2 and 3, drive tube 29 is assembled to slide through bore 31 of pulley wheel 30. A key 32 integral with pulley wheel 30 engages key way 34 of drive tube 29. Pulley wheel 30 is assembled on frame 50 of the apparatus and can be rotated by motor 35 using belt transmission 36. Motor 43 and 35 are assembled on frame 50 of the apparatus.

Forward and opposite rotations of motor 35 cause rotation of drive tube 29 around axis 27'. This causes gear portion 29' to rotate around axis 27'. Consequently, second support member 26 rotates around axis 25' for causing needle 20 to rotate around axis 25', like has been described above when passing between the needle orientations for winding and termination.

Wire W reaches needle 20 from a tensioner (not shown) by passing through guide tube 38, which is fixed to a clamp ring 39 (see FIGS. 2 and 2A). The clamp ring is fixed to member 60 so that guide tube 38 rotates with drive tube 29 around axis 27'. Consequently wire W rotates around axis 27 in synchronism with the rotation of needle passage 21 around axis 25' in order to avoid that wire W remains entangled or hindered in its motion towards the core during winding and termination.

The portion of the apparatus of the invention that is required to travel through the core comprises drive tube 29, support shaft 27, needle 20, member 22, member 26 and member 23. As shown in the FIGS. 2-6, drive tube 29 and support shaft 27, which are primary members for supporting the needle have a coaxial configuration which can be extremely compact in a transverse direction with respect to the longitudinal axis 11' of the core. This makes it possible to wind cores having interiors of reduced size, therefore cores that are more compact.

The configuration of drive tube 29 and support shaft 27 make it possible to have extremely optimized inertia, therefore these parts can be rapidly and precisely translated and rotated by motors 35 and 43.

Needle 21 can be easily substituted by releasing and securing guide member 23 where cores requiring different winding and termination specifications need to be processed and therefore require needles of other sizes. Similarly, the entire assembly consisting of drive tube 29 assembled on support shaft 27, member 26 assembled on support shaft 27, member 22 assembled on member 26 and needle 20 assembled on member 22 can be disassembled as a unit by disassembly of drive tube 29 and support shaft 27 from connection structure 41. This entire assembly forming a unit can be substituted with another unit of different size when requiring to wind cores having different configurations, for example when requiring to process significantly different core heights.

Member 22 can be substituted with another similar member of different size to position needle 20 in a required relation with respect to axis 25' or axis 27'. In this way the angle between the rotation axis 25' and the reference axis 27', or between the rotation axis 25' and the axis 21' of the passage, can be maintained constant or changed.

The tension exerted on wire W for winding and termination is mainly supported on drive tube 29 and support shaft 27. Drive tube 29 and support shaft 27 are well supported by bearing 62 and bushes 37, therefore high tension of wire W can be reliably supported by the apparatus when winding and terminating large size conductors.

Figure 6:
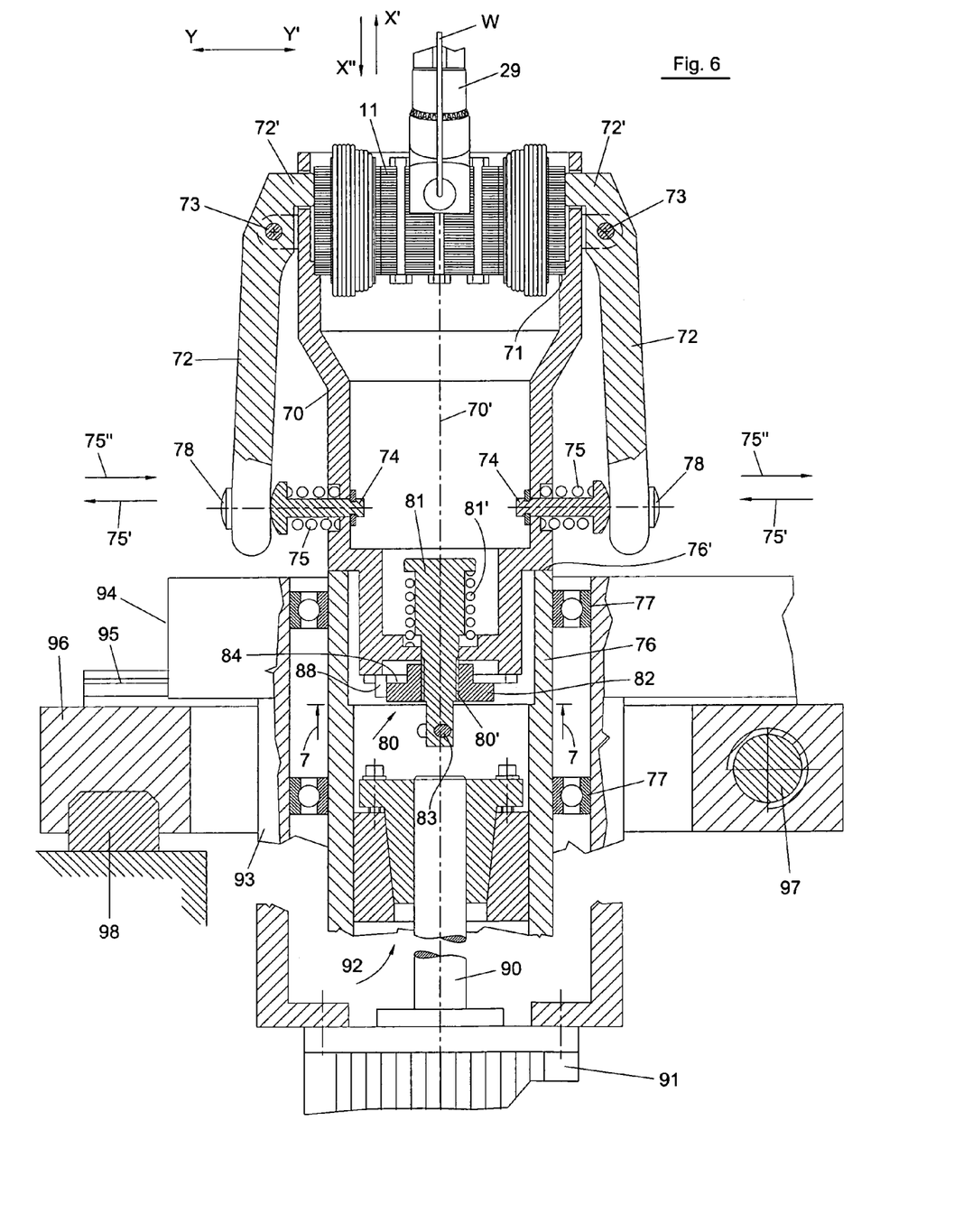
FIG. 6 is a partial section view similar to the view of FIG. 2 illustrating an assembly for supporting and positioning the core in the apparatus of the invention.

By means of programmable rotation of motor 35, needle passage 21 can rotate around axis 25' as a function, for example of the position of needle 20 during winding and termination. The programmability of the rotation of needle passage 21 around axis 25' can be applied for winding turns or forming termination leads along predetermined trajectories with respect to the core, and also according to predetermined sequences of motion of the apparatus. For example, needle 20 can be rotated around axis 25' so that it remains out of the plane of FIG. 3 for certain stages of termination. The reason can be for allowing the needle to move on predetermined trajectories necessary for coursing the leads and for clearing certain structure that are present on the core. With reference to FIG. 6, core 11 is shown supported and positioned by means of tubular member 70. More particularly, core 11 is seated in groove 71 of tubular member 70 for centering core 11 and positioning it with respect to centre axis 70' of tubular member 70. Therefore longitudinal axis 11' can coincide with centre axis 70'. Centre axis 70' can be the axis of symmetry of tubular member 70.

Arms 72 are hinged in 73 to appendixes of member 70. Portions 72' of arms 72 are required to press on the external surface of core 11, as shown in FIG. 6 to firmly press on core 11 when it is seated in groove 71. Portions 72' are maintained in contact with the core by the pressing action of pressing members 74 on end portions of arms 72, as shown in FIG. 6. Pressing members 74 are assembled to slide on tubular member 70 in radial directions 75' to press on end portions of arms 72 by means of the preload force of springs 75, as shown in FIG. 6.

By pressing in opposite direction 75" on portion 78 of arms 72, i.e. against the preload force of springs 75, arms 72 release the pressing action on the core, and also rotate away to allow core 11 to be moved in direction X' for extraction of core 11 from tubular member 70.

Member 70 is supported on the axial end 76' of ring member 76, as shown in FIG. 6. A key and slot connection (not shown) between member 70 and ring member 76 (with the key and the slot that extend parallel to axis 70'), couples member 70 to ring member 76 for their rotation together around axis 70'.

Ring member 76 is supported on radial bearings 77 for rotation around axis 70'. Bearings 77 are supported on portion 93 of platform 94

Member 70 is locked to ring member 76 along axis 70' by means of lock mechanism 80. Lock mechanism 80 is a rapid lock and release coupling mechanism that allows member 70 to be easily and rapidly disassembled and reassembled with respect to ring member 76.

Member 70 can be substituted when requiring to seat cores of different configuration that need to be wound and terminated.

Mechanism 80 is provided with a shaft member 81, which is assembled to pass through an end bore of member 70, as shown in FIG. 6. Shaft member 81 is normally pressed in direction X' by the preload of spring 81', which presses on the upper portion of member 81.

Portion 80' of shaft member 81 is threaded and screws into a threaded bore of plate member 82, as shown in FIG. 6. Pin 83 is fixed in a cross manner near an end of member 80, as shown in FIGS. 6 and 7.

Figure 7:
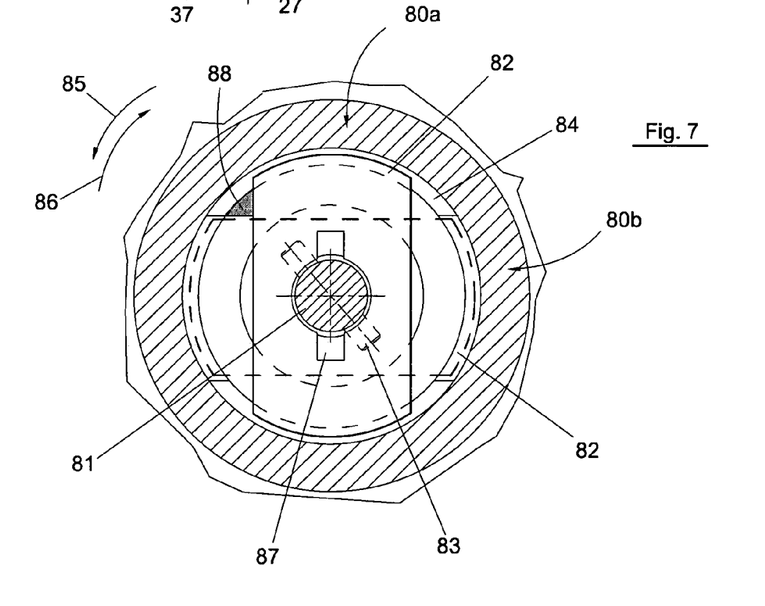
FIG. 7 is a partial section view from directions 7-7 of FIG. 6.

With reference to FIG. 7, plate member 82 can be rotated between a position 80a and a position 80b (shown with dashed line representation) and vice versa around axis 70'. In position 80a, plate member 82 secures member 70 to ring member 76. In position 80b of plate member 82, member 70 results unlocked and therefore member 70 can be disassembled from ring member 76.

By screwing shaft member 81 on plate member 82 (by means of the rotation in direction 85), plate member 82 is pulled against shelf 84 of member 70 to secure member 70 to ring member 76; see position 80a of plate member 82 in FIGS. 6 and 7.

By unscrewing shaft member 81 (by means of a rotation in direction 86), plate member 82 is released and rotated to the position 80b. More particularly, plate member 82 is rotated to the position 80b after having unscrewed shaft member 81 until pin 83 is brought against plate member 82 and moved into slot 87 of plate member 82 (see FIG. 7). When pin 83 is seated in slot 87, rotation 86 rotates member 82 to position 80b.

When member 70 is reassembled on ring member 76, pin 83 can be brought out of slot 87 by screwing shaft member 81 using rotation in direction 85. The initial effect of the rotation in direction 85 is that of bringing plate member 82 to position 80a for locking. By pressing shaft member 81 in direction X", therefore against the pushing action of spring 81', pin 83 is brought out of slot 87. Continuing with the rotation in the direction 85, shaft member 81 is screwed into the threaded bore of plate member 82 so that plate member 82 is pulled against shelf 84 of member 70 to secure member 70 to ring member 76. Extension 88 of member 70 acts as an abutment surface to maintain position of plate member 82 and react during the screwing rotation of shaft member 81. The action of spring 81' maintains a certain pull on the thread existing between shaft member 81 and plate member 82 to maintain pin 83 secure in slot 87, when member 70 is removed for substitution.

Shaft 90 of motor 91 is coupled to ring member 76 by means of a conventional conical coupling 92. Motor 91 is flanged to portion 93 of platform 94. Platform 94 is assembled on guides 95 to translate in directions Y and Y' by means of a programmable motor drive (not shown). Guides 95 are assembled on a second platform 96, which move on guides 98 towards and away with respect to an observer view of FIG. 6, therefore perpendicular to directions Y and Y'. The second platform 96 accomplishes this movement by means of a programmable motor drive (not shown) which turns screw 97.

Motions of platform 94 in directions Y and Y' and motions of second platform 96 towards and away with respect to an observer view of FIG. 6 can be used to position core 11 during termination operations. Motions of second platform 96 towards and away with respect to an observer view of FIG. 6 can also be used to position core 11 during winding, for example to stratify wire W when winding the coils.

The motion of the second platform 96 towards and away with respect to an observer view of FIG. 6 can be used to carry away the finished core, or for positioning the new core in relation to the work area of the apparatus. During this motion, portions 78 of arms 72 can come in contact with a cam surface (not shown) having a profile for moving arms 72 away from the core and therefore freeing the core so that it can be unloaded and substituted with another core to be processed.

Figure 8:
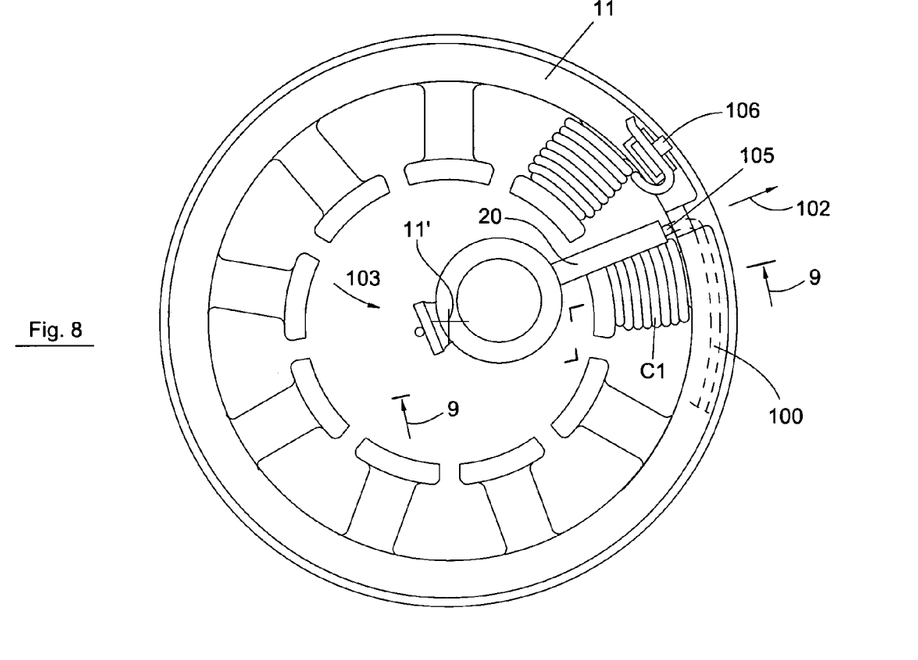
FIG. 8 is a plan view of FIG. 2 illustrating a position of the conductor dispensing nozzle in relation to the core in the apparatus of the invention.
Figure 9:
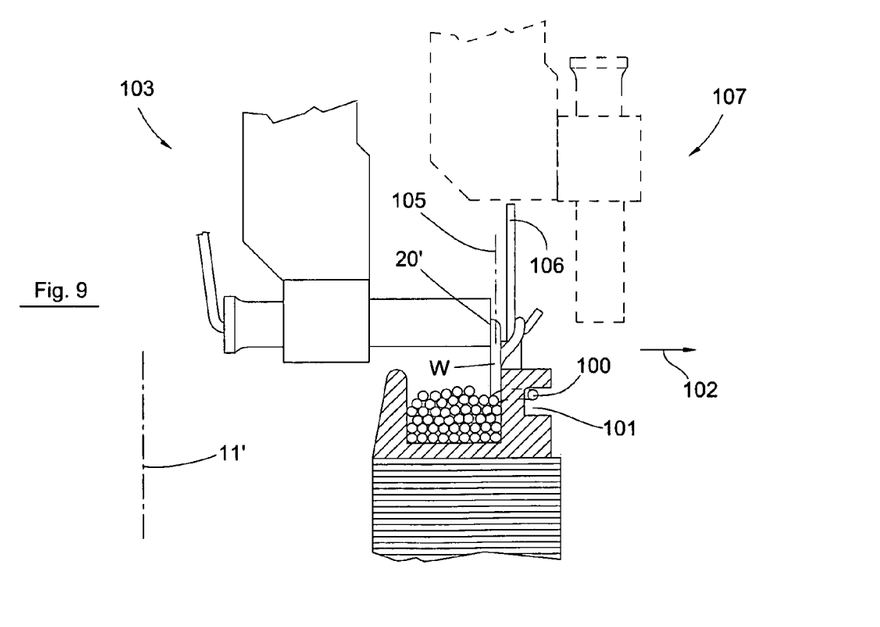
FIG. 9 is a partial section view from directions 9-9 of FIG. 8.

With reference to FIGS. 8 and 9 at the end of winding a coil portion C1, needle 20 has wire W extending to the coil. Wire W can be extending from core 11 along an extension line 105 that is parallel to the longitudinal axis 11' of the core, as shown in FIG. 9. In FIGS. 8 and 9 needle 20 is oriented in a first orientation 103 with respect to core 11, in which exit 20' can be positioned within the perimeter of the core 11 and facing in a direction 102 away from the axis 11' of the core. Successively, wire W may need to be laid as a termination lead like 100 on core 11 (shown with dashed line representation in FIG. 8), i.e. along an external portion 101, which can be a channel, like is shown in FIGS. 9 and 11.

Figure 10:
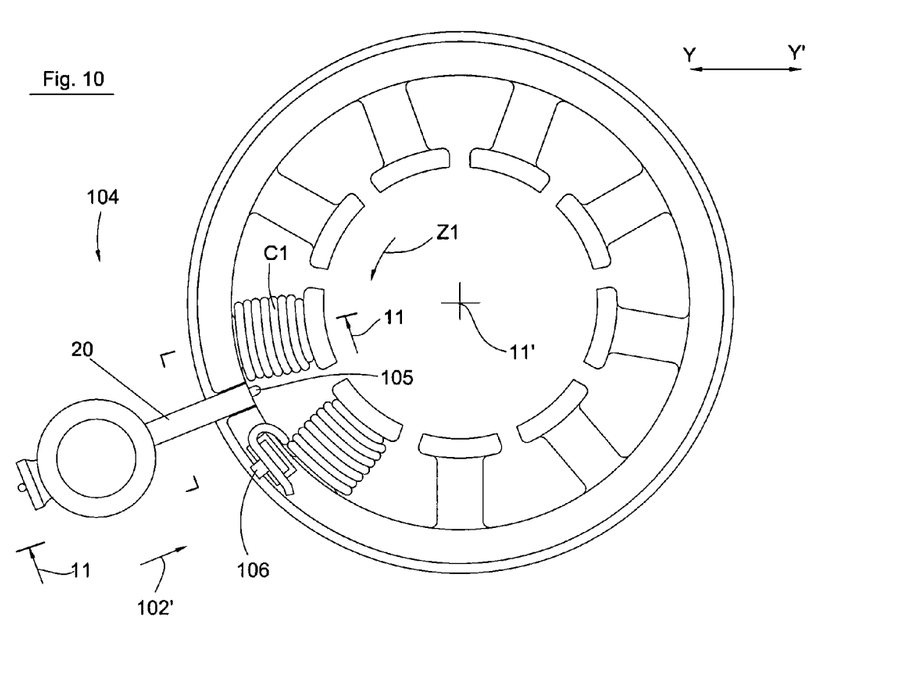
FIG. 10 is a plan view of FIG. 2 illustrating a further position of the conductor dispensing nozzle in relation to the core in the apparatus of the invention.

To place the lead like 100, needle 20 can be kept stationary and core 11 can be rotated around wire extension line 105. The result reached is shown in FIG. 10 where needle 20 has become oriented according to a second orientation 104 with respect to core 11, i.e. with exit 20' facing in a direction 102' towards axis 11' of the core and a portion of needle 20 is positioned external to the core. In certain cases this second condition may not be with the needle external to the core, for example when the lead needs to be positioned on a wide axial face of the core.

The rotation of core 11 around extension line 105 can be achieved by a combination of translating platform 94 in directions Y Y', translating second platform 96 towards and away with respect to the observer view of FIG. 6, i.e. perpendicular to the movement in directions Y and Y', and rotation of motor 91, i.e. rotating core 11 around axis 11'.

Figure 11:
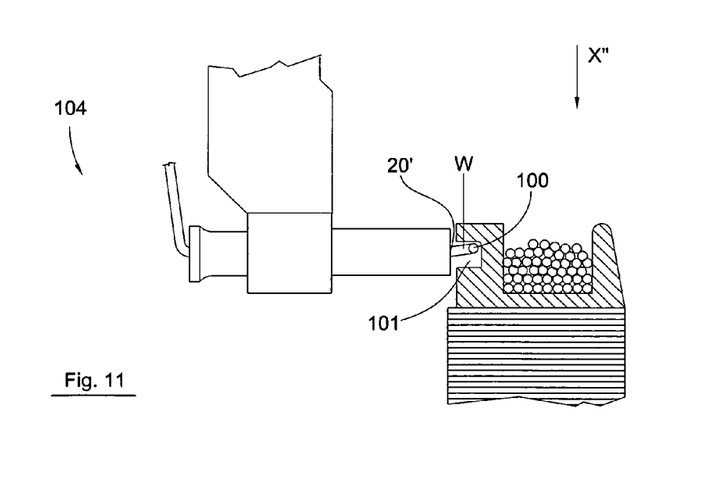
FIG. 11 is a partial section view from directions 11-11 of FIG. 10, although with certain parts displaced by a certain quantity of motion

After the condition shown in FIG. 10 is reached, needle 11 can be translated in direction X" to align exit 20' with external portion 101 of core 11, as shown in FIG. 11. FIG. 11 shows that exit 20' can be very near to portion 101 to achieve that wire W can be deposited with accuracy and without pulling an excessive amount of wire from needle 20 during a successive rotation Z1 of the core 11 around axis 11' for laying the lead like 100. The phantom line representation 107 of needle 20 and support members 22 and 26 shown in FIG. 9 illustrates how there can be interference with a termination tang 106 of the core when moving the needle in direction X" for termination. The previously described rotation around an extension line like 105 avoids such interferences.

It should be contemplated that instead of moving core 11 as described above for rotation around an extension line like 105, needle 11 could be rotated around an extension line like 105 to reach the relative position of needle 20 with respect to core 11 as shown in FIGS. 9 and 10

It will be understood that the foregoing is only illustrative of the principles of this invention, and that various modifications can be made by those skilled in the art without departing from the scope and spirit of the invention.

The invention claimed is:

1. Apparatus for winding coils of at least one electrical conductor for at least one core of a dynamoelectric machine and for forming termination leads of the coils, the core having a longitudinal axis, the apparatus comprising:

a dispensing member for dispensing the electrical conductor, the dispensing member having a portion of conductor passage and an exit from where the conductor reaches the core;

means for relatively moving the dispensing member (20) with respect to the core during winding or forming of the termination leads;

means for supporting the dispensing member;

means for rotating the means for supporting around a rotation axis to re-orient the dispensing member between an orientation for winding the coils and an orientation for forming the termination leads wherein the rotation axis is inclined at an angle that is not at 90° with respect to the dispensing member.

2. Apparatus of claim 1 wherein the rotation axis 45° with respect to the dispensing member.

3. Apparatus of claim 1 wherein the rotation axis is inclined with respect to an axis of reference for positioning the dispensing member to accomplish relative movement during winding or forming of the termination leads; and wherein the rotation axis and the axis of reference being inclined for more than 0° and less than 90° to each other.

4. Apparatus of claim 3 wherein the axis of reference is positioned parallel and shifted with respect to the longitudinal axis; or the axis of reference is positioned coincident with the longitudinal axis.

5. Apparatus of claim 3 wherein the axis of reference is positioned parallel to a direction of relative translation of the dispensing member with respect to the core.

6. Apparatus of claim 3 wherein the rotation axis and the axis of reference are inclined at an angle of 45° to each other.

7. Apparatus of claim 3 wherein the rotation of the means for rotating to re-orient the dispensing member is for an angle of 180° about the axis of reference.

8. Apparatus of claim 3 wherein the supporting means further comprises a portion extending parallel to the axis of reference and a drive member, the drive member being assembled coaxial to the portion extending parallel to the axis of reference.

9. Apparatus of claim 8 wherein the drive member is coupled through a key coupling to a rotation actuator for transmitting rotation motion to the drive member and the key coupling allowing translation motion of the drive member when the dispensing member translates parallel to the axis of reference.

10. Apparatus of claim 1 wherein the rotation axis and an axis of the conductor passage are inclined for more than 0° and less than 90° to each other and form a section plane for the dispensing member when the dispensing member is in the winding position; the axis of the passage being rotated out of the plane during the rotation to re-orient the dispensing member.

11. Apparatus of claim 10 wherein the rotation axis and the axis of the passage are inclined at an angle of 45° to each other.

12. Apparatus of claim 1 wherein the spatial configuration described by an axis of the passage during the rotation is a portion of a cone.

13. Apparatus of claim 1 wherein the rotation axis intersects the exit during the rotation.

14. Apparatus of claim 1 wherein the portion of the conductor passage changes orientation by an angle of 90° to reorient the dispensing member.

15. Apparatus of claim 1 wherein the rotating means comprises a first gear coupled to a drive member; the supporting means comprises a second gear and a pin for rotation of the second gear; the pin being assembled along the rotation axis.

16. Apparatus of claim 15 wherein the supporting means comprises a releasable support portion for carrying the dispensing member.

17. Apparatus of claim 1 wherein the at least one core is supported and secured in the apparatus by means of a tubular support member, the tubular support member being coupled to the apparatus by means of a rapidly releasing coupling mechanism located within the tubular support member.

18. A method for winding coils of at least one electrical conductor for at least one core of a dynamoelectric machine and for forming termination leads of the coils, the core having a longitudinal axis, the method comprising the steps of:

dispensing the electrical conductor with a dispensing member having a portion of conductor passage leading to an exit where the conductor exits to reach the core;

relatively moving the dispensing member with respect to the core during winding or forming of the termination leads;

rotating the dispensing member around a rotation axis to re-orient the dispensing member between an orientation for winding the coils and an orientation for forming the termination leads; wherein:

the rotation axis is inclined with an angle that is not at 90° with respect to the dispensing member.

19. The method of claim 18 further comprising rotating the dispensing members around the rotation axis wherein the rotation axis is inclined with respect to the axis of reference to position the dispensing member during winding or forming of the termination leads.

20. The method of claim 19 further comprising positioning the axis of reference parallel and shifted with respect to the longitudinal axis or positioning the axis of reference coincident with the longitudinal axis.

21. The method of claim 19 further comprising positioning the axis of reference parallel to a direction of relative translation of the dispensing member with respect to the core.

22. The method of claim 18 further comprising intersecting an axis of the conductor passage with the rotation axis, the rotation axis and the axis of the passage forming a plane; and rotating the passage out of the plane during the rotation to re-orient the dispensing member.

23. The method of claim 22 further comprising selectively rotating a portion of the passage out of the plane during the rotation to re-orient the dispensing member.

24. The method of claim 18 further comprising rotating the dispensing member with the rotation axis inclined at an angle of 45° to an axis of the passage.

25. The method of claim 18 further comprises rotating the dispensing member through an angle of 180° about the rotation axis for changing orientation of the conductor passage by an angle of 90°.

26. The method of claim 18 further comprising rotating the dispensing member around the rotation axis with the rotation axis intersecting the exit during the rotation.

27. Apparatus for winding coils of at least one electrical conductor for at least one core of a dynamoelectric machine and for forming termination leads of the coils, the core having a longitudinal axis, the apparatus comprising:

a dispensing member for dispensing the electrical conductor, the dispensing member having a portion of conductor passage and an exit from where the conductor reaches the core;

means for relatively moving the dispensing member with respect to the core during winding or forming of the termination leads;

means for supporting the dispensing member; and means for reorienting the exit between a first orientation wherein the exit is positioned internally of the core and faces in a direction away from the centre of the core and a second orientation for terminating the core wherein the exit faces in a direction towards the centre of the core.

28. The apparatus of claim 27 wherein the means for reorienting the exit comprises rotating the core around a position where the conductor extends from the core.

29. The apparatus of claim 27 wherein the means for reorienting the exit comprises rotating the dispensing member around a position where the conductor extends from the core.

30. The apparatus of claim 27 wherein the conductor extends from the core along an extension line that is parallel to the longitudinal axis of the core.

31. The apparatus of claim 27 wherein in the second orientation the exit faces a portion of the core where the conductor is positioned on a termination path.

32. The apparatus of claim 27 wherein the exit of the dispensing member is perpendicular to the longitudinal axis of the core in the first and the second orientation.

33. The apparatus of claim 27 wherein the means for reorienting the exit comprises means for translating the core in two directions perpendicular to each other and means for rotating the core around the longitudinal axis of the core.

34. The apparatus of claim 27 wherein in the second orientation the exit is positioned externally of the core.

35. A method for winding coils of at least one electrical conductor for at least one core of a dynamoelectric machine and for forming termination leads of the coils, the core having a longitudinal axis, the method comprising the steps of:
dispensing the electrical conductor with a dispensing member having a portion of conductor passage leading to an exit where the conductor exits to reach the core;
relatively moving the dispensing member with respect to the core during winding or forming of the termination leads; and
reorienting the exit between a first orientation where the exit is positioned internally of the core and faces in a direction away from the centre of the core and a second orientation for terminating the core where the exit faces in a direction towards the centre of the core.

36. The method of claim 35 wherein reorienting the exit comprises rotating the core around a position where the conductor extends from the core.

37. The method of claim 35 wherein reorienting the exit comprises rotating the dispensing member around a position where the conductor extends from the core.

38. The method of claim 35 wherein the conductor extends from the core along an extension line that is parallel to the longitudinal axis of the core.

39. The method of claim 35 wherein in the second orientation the exit faces a portion of the core where the conductor is positioned on a termination path.

40. The method of claim 35 wherein the exit of the dispensing member is perpendicular to the longitudinal axis of the core in the first and the second orientation.

41. The method of claim 35 wherein reorienting the exit comprises translating the core in two directions perpendicular to each other and rotating the core around the longitudinal axis of the core.

42. The method of claim 35 wherein in the second orientation the exit is positioned externally of the core.

* * * * *